W. F. MITCHELL & E. E. HENRY.
AUTOMOBILE WHEEL CONTROLLING MEANS.
APPLICATION FILED DEC. 24, 1913.
1,104,534.
Patented July 21, 1914.
2 SHEETS—SHEET 2.
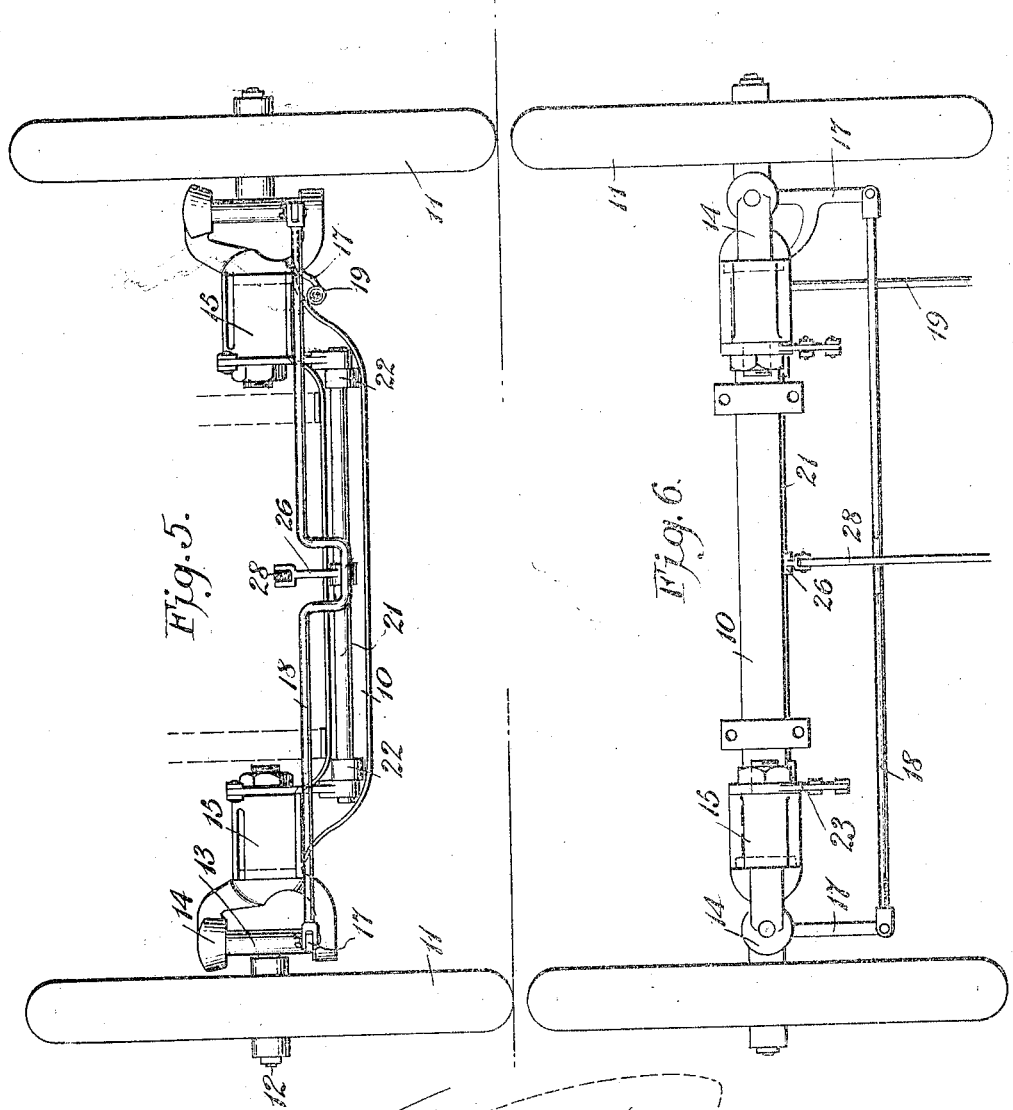
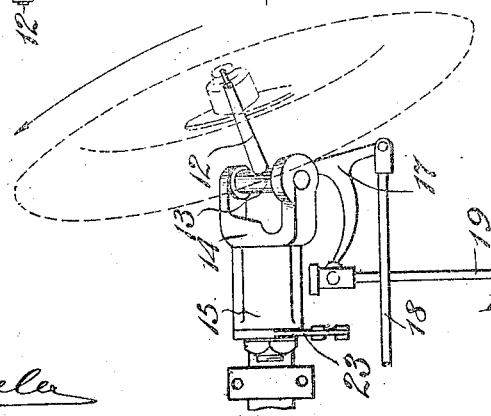
WITNESSES
INVENTORS
Walter F. Mitchell
Eugene E. Henry
BY
ATTORNEYS

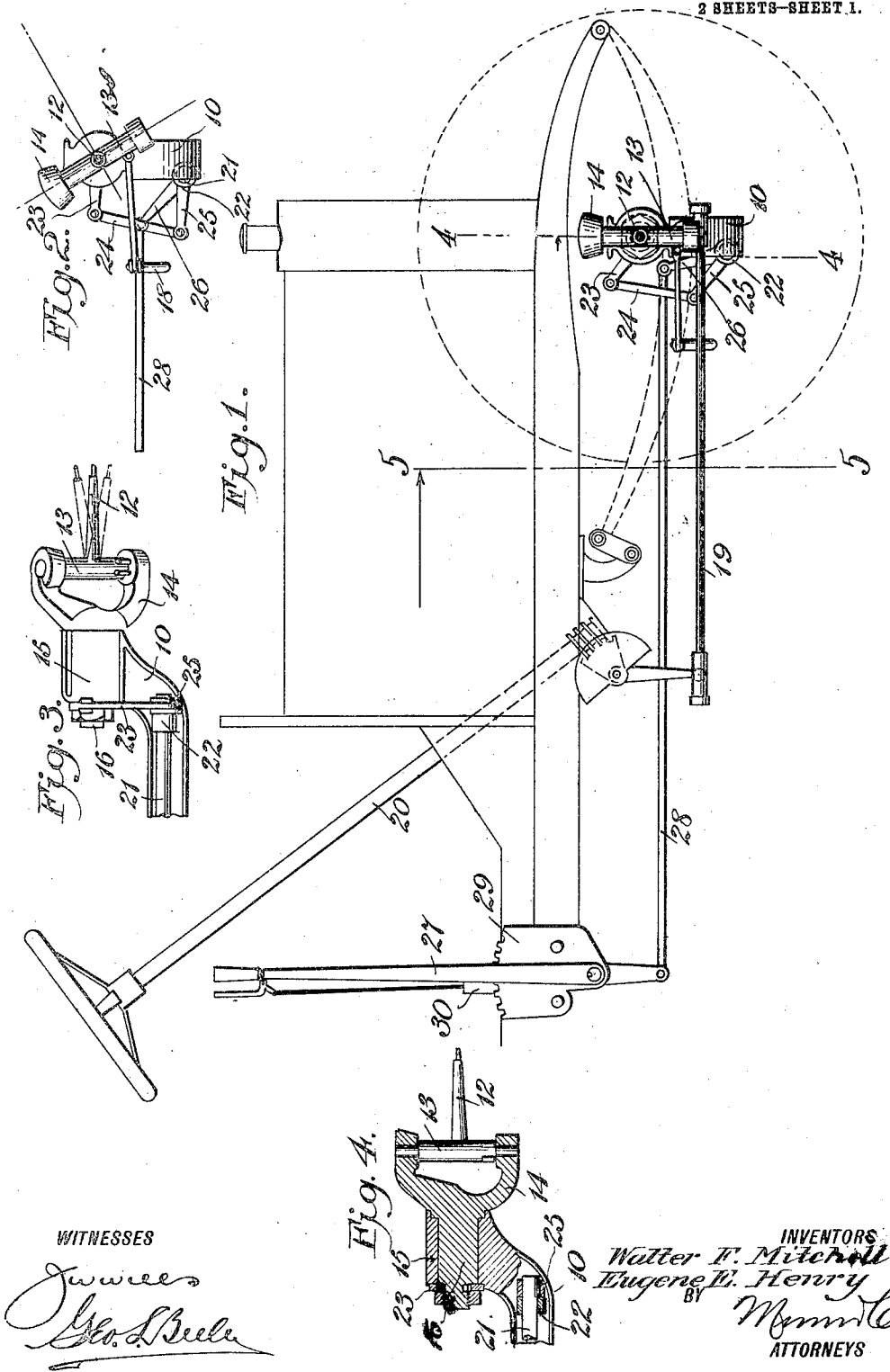

UNITED STATES PATENT OFFICE.

WALTER F. MITCHELL AND EUGENE E. HENRY, OF ASTORIA, OREGON.

AUTOMOBILE WHEEL-CONTROLLING MEANS.

1,104,534.

Specification of Letters Patent. Patented July 21, 1914.

Application filed December 24, 1913. Serial No. 808,588.

*To all whom it may concern:*

Be it known that we, WALTER F. MITCHELL and EUGENE E. HENRY, citizens of the United States, and residents of Astoria, in the county of Clatsop and State of Oregon, have invented a new and Improved Automobile Wheel-Controlling Means, of which the following is a full, clear, and exact description.

This invention relates to carriages and wagons and has particular reference to the running gear of such vehicles.

Among the objects of the invention is to provide a controlling means for wheels such as high speed motor vehicle wheels, whereby said wheels may be tilted while turning a curve for the purpose of reducing the tendency of skidding and to minimize the danger of straining the wheels and the means for supporting the wheels.

More specifically stated, we provide mechanism to be used in conjunction with any well known or approved form of steering mechanism whereby the steering knuckles, when steering laterally in either direction, will cause the spindles to assume an inclined position thereby causing the wheels to have their upper sides tilted in the direction in which the vehicle is being turned. The centrifugal force of the machine tending to break or strain the wheels will consequently be brought practically in the direction of the spokes or in the same direction in which the weight of the machine is borne when running on straight courses.

The foregoing and other objects of the invention will hereinafter be more fully described and claimed and illustrated in the drawings forming a part of this specification in which like characters of reference indicate corresponding parts in all the views, and in which—

Figure 1 is a diagrammatic representation in side elevation of the right hand portion of the front of an automobile equipped with our improvement; Fig. 2 is a view of our invention showing the manner of tilting the steering knuckle; Fig. 3 is a rear elevation of the mechanism shown in Fig. 2; Fig. 4 is a vertical section substantially on the line 4—4 of Fig. 1; Fig. 5 is an elevation of the front axle and associated parts as seen from the plane indicated by the line 5—5 of Fig. 1; Fig. 6 is a plan view of the same; and Fig. 7 is a diagrammatic plan view indicating the effect of the combined tilting and steering mechanisms, the vehicle being presumed to be turning toward the left.

The several parts of the device may be made of any suitable materials, and the relative sizes and proportions, as well as the general design of the mechanism, may be varied to a considerable extent without departing from the spirit of the invention hereinafter more fully set forth and specifically claimed.

At 10 we show a vehicle axle of any suitable character and supported by wheels 11 journaled upon the spindles 12 of steering knuckles 13. Each steering knuckle is journaled on a normally vertical axis in a steering head 14. These heads normally are formed as parts of the usual axle, but in our improvement the heads 14 are journaled on a horizontal axis in any suitable manner in bearings 15 at the ends of the axle. Without unnecessarily limiting our invention to the specific illustration in the drawings, we indicate that each head 14 is supported by means of a shank 16 secured in the adjacent bearing 15. This construction relates especially to that type of motor vehicles in which the axle 10 is of the drop type so as to provide a proper seating space for the motor or the vehicle body.

Any suitable means may be employed to effect the usual steering of the machine, such means being shown in this instance as a lever 17 connected to each steering knuckle extending therefrom substantially at a right angle to the vertical axes of the knuckle and the levers 17 of the two steering knuckles connected by a cross bar 18. A drag link 19 is connected to one of the levers 17. A steering wheel shaft 20 acts in any usual way to cause the link 19 to be moved forwardly or rearwardly to cause the steering knuckles and wheels to swing around the axes of the knuckles 13 parallel to each other. Under ordinary circumstances the knuckles 13 always remain vertical and the spindles substantially horizontal irrespective of the amount of swing that may be imparted to the spindle due to the usual steering apparatus.

We provide connections with the steering heads 14 whereby the knuckles 13 are tilted out of the vertical in either direction as shown in Figs. 2 and 3, whereby, when the spindles are swung forwardly or rearwardly to steer the vehicle they will be caused by the tilting of the knuckles to assume an inclined position causing the wheels to tilt in a corresponding direction. One practical means which we have used for accomplishing this object includes a rock shaft 21 journaled upon the depressed portion of a drop axle connected in bearings 22 and having connections to the steering head shanks or shaft whereby, when the rock shaft 21 is rotated through a certain angle, the shanks and steering heads are likewise rotated sufficiently far to give the desired amount of tilt to the knuckles.

23 indicates a lever connected to the adjacent shank 16 and pivotally connected by a link 24 to an arm 25 secured to the rock shaft 21 adjacent the bearing 22. Said arm 25 and lever 23 are or may be of substantially the same length and be caused to move parallel to each other by said link 24.

At any desired place the rock shaft 21 is fitted with a crank 26 through which a hand lever 27 may operate the rock shaft by means of a connecting rod 28. The hand lever 27 may be set in any desired position by means of a quadrant 29 and a dog 30, and under certain conditions such adjustment may be permanent or left undisturbed for the reason that when the steering mechanism is in mid position or the wheels are running parallel to the longitudinal axis of the vehicle, the spindles 12 are substantially horizontal regardless of any rotation of the shanks 16 or inclination of the knuckles 13.

Having thus described our invention, we claim as new and desire to secure by Letters Patent:—

1. In a device of the character set forth, the combination with a vehicle axle, steering heads connected thereto, steering knuckles journaled in said heads, and wheels connected to said steering knuckles, of means associated with said steering heads to cause rotation thereof around an axis parallel to the axle.

2. In a device of the character set forth, the combination with an axle, steering heads connected to the axle, knuckles journaled in said heads on normally vertical axes, said knuckles having normally horizontal spindles, and wheels journaled on said spindles, of means journaled on the axle and having connections with said heads to cause the same to rotate to a certain extent in either direction around an axis parallel to the axle, and means to control the steering of the wheels through said steering knuckles.

3. In a device of the character set forth, the combination with an axle having bearings at its ends arranged in longitudinal alinement, a pair of steering heads journaled coaxially in said bearings, steering knuckles mounted on normally vertical axes in said heads, wheels connected to said steering knuckles, means to turn the knuckles in parallelism around their axes, and means connected to said steering heads to cause rotation thereof around their common axis independently of the operation of the steering mechanism.

4. In a device of the character set forth, the combination of a drop axle having coaxially arranged bearings at its ends, a rock shaft journaled along and parallel to the main portion of the axle, a pair of steering heads having coaxially arranged shanks journaled in said bearings, arms and links connecting said shanks and said rock shaft, means to control the rotation and position of the rock shaft, and said steering heads, steering knuckles journaled in said heads, wheels mounted upon the steering knuckles, and steering mechanism acting upon said steering knuckles and wheels independently of the head controlling means.

In testimony whereof we have signed our names to this specification in the presence of two subscribing witnesses.

WALTER F. MITCHELL.
EUGENE E. HENRY.

Witnesses:
U. C. BURCROFF,
A. W. LAWSON.